(12) United States Patent
Delisio

(10) Patent No.: US 12,487,512 B2
(45) Date of Patent: Dec. 2, 2025

(54) LIFTING RACK J-HOOK PHONE/CAMERA MOUNT

(71) Applicant: Nicholas David Delisio, Lorton, VA (US)

(72) Inventor: Nicholas David Delisio, Lorton, VA (US)

( * ) Notice: Subject to any disclaimer, the term of this patent is extended or adjusted under 35 U.S.C. 154(b) by 192 days.

(21) Appl. No.: 18/512,367

(22) Filed: Nov. 17, 2023

(65) Prior Publication Data

US 2025/0164861 A1 May 22, 2025

(51) Int. Cl.
*G03B 17/56* (2021.01)
*A63B 21/078* (2006.01)
*F16M 13/02* (2006.01)

(52) U.S. Cl.
CPC .......... *G03B 17/561* (2013.01); *A63B 21/078* (2013.01); *F16M 13/022* (2013.01); *A63B 2225/685* (2013.01); *F16M 2200/06* (2013.01)

(58) Field of Classification Search
CPC ................ G03B 17/561; A63B 21/078; A63B 2225/685; A63B 2225/09; A63B 2225/093; F16M 13/022; F16M 2200/06; F16M 11/40; F16M 13/00; F16M 13/02
See application file for complete search history.

(56) References Cited

U.S. PATENT DOCUMENTS

| | | | |
|---|---|---|---|
| 3,173,386 A | 3/1965 | Magers | |
| 6,315,180 B1 | 11/2001 | Watkins | |
| 8,474,832 B2 | 7/2013 | Mersky | |
| 9,348,119 B2 | 5/2016 | Thomson | |
| 9,907,991 B2 * | 3/2018 | Leipheimer | ........ A63B 21/0626 |
| 10,352,498 B2 | 7/2019 | Rieger | |
| 10,737,140 B2 | 8/2020 | Rothman et al. | |
| 10,960,266 B2 | 3/2021 | Messinger | |
| 11,135,473 B2 * | 10/2021 | Gettle | ...................... H04M 1/04 |
| 11,571,604 B2 | 2/2023 | Aref | |
| 11,577,584 B2 | 2/2023 | Harms et al. | |
| 2005/0233871 A1 * | 10/2005 | Anders | ................ A63B 21/078 |
| | | | 482/8 |
| 2010/0264182 A1 | 10/2010 | Perlman et al. | |
| 2014/0091192 A1 | 4/2014 | Mersky | |
| 2018/0251078 A1 | 9/2018 | Kim | |
| 2019/0247701 A1 * | 8/2019 | Sergakis | ................. F16B 45/00 |
| 2021/0077884 A1 | 3/2021 | De las Casas Zolezzi et al. | |
| 2021/0125698 A1 | 4/2021 | Bengtsson | |
| 2021/0170218 A1 | 6/2021 | Lewis-Dove | |
| 2021/0205660 A1 | 7/2021 | Shavit | |
| 2022/0062687 A1 * | 3/2022 | Gao | ................... A63B 21/0783 |
| 2024/0293723 A1 * | 9/2024 | Baker | .................. A63B 22/001 |
| 2025/0177803 A1 * | 6/2025 | Cohen | ................ A63B 21/4035 |

* cited by examiner

*Primary Examiner* — Andrew M Kobylarz
(74) *Attorney, Agent, or Firm* — Dunlap Bennett & Ludwig, PLLC

(57) ABSTRACT

A lifting rack j-hook phone/camera mount assembly is provided. The lifting rack j-hook phone/camera mount assembly includes a flexible arm that extends from an electronic device to the lifting rack frame member to selective attach to one of the plurality of holes along the frame member. A mounting peg and modified j-hook body is dimensioned and shaped to facilitate that selective attachment.

8 Claims, 3 Drawing Sheets

LIFTING RACK J-HOOK PHONE/CAMERA MOUNT

BACKGROUND OF THE INVENTION

The present invention relates to exercise equipment accessories and, more particularly, to a lifting rack j-hook phone/camera mount.

Gym patrons often must place their phone/camera on the ground or other equipment to film their workout increasing risk of equipment damage or unsteady mounting. Current phone/camera mounts require support from the ground or to be balanced on other equipment, thereby increasing risk to phone/camera. items on the ground in a gym are at risk of damage.

As can be seen, there is a need for a lifting rack j-hook phone/camera mount.

SUMMARY OF THE INVENTION

Mounting mobile devices on the weightlifting rack reduces risk of damage, maintains secure placement, and provides sufficient support for setting a desire angle or orientation during use.

The present invention combines a weightlifting j-hook with a phone/camera mount assembly in order place phone/camera off the ground through engaging weightlifting rack holes.

In one aspect of the present invention, a lifting rack j-hook mount assembly, the assembly includes the following: a flexible arm extending from a proximal end to a distal end; the distal end configured to operatively associate with an electronic device mount; and the proximal end configured to operatively associate with a frame member of lifting rack.

In another aspect of the present invention, the lifting rack j-hook mount assembly further includes wherein the proximal end selectively associates with one of a plurality of holes of said frame member; a modified j-hook body configured to receive at least two faces of said frame member so as to place a brace plate between the proximal end and said frame member, wherein the modified j-hook body comprises a mounting peg that provides a connector that passes through the one of the plurality of holes and the brace plate, wherein the modified j-hook body further comprises an angle bracket portion having two legs orthogonally joined, and wherein at least one leg is parallel with a face of the frame member that is orthogonal relative to the brace plate, wherein an upper elevation of the angle bracket portion is downward of an upper elevation of the brace plate; further including a threaded ring disposed between the brace plate and the proximal end, wherein an electronic device removably mounts to the electronic device mount, and wherein the flexible arm comprises multiple articulating joints.

In yet another aspect of the present invention, a method of selectively and removably attaching an electronic device to a lifting rack, the method includes the following: providing the above-disclosed lifting rack j-hook mount assembly; and engaging at least one leg of the angle bracket portion in a parallel orientation of a first face of a frame member of the lifting rack so that the brace plate is adjacent and parallel with a second face to which the proximal end is desired to be operatively associated to.

These and other features, aspects and advantages of the present invention will become better understood with reference to the following drawings, description and claims.

DETAILED DESCRIPTION OF THE INVENTION

Figure 1:
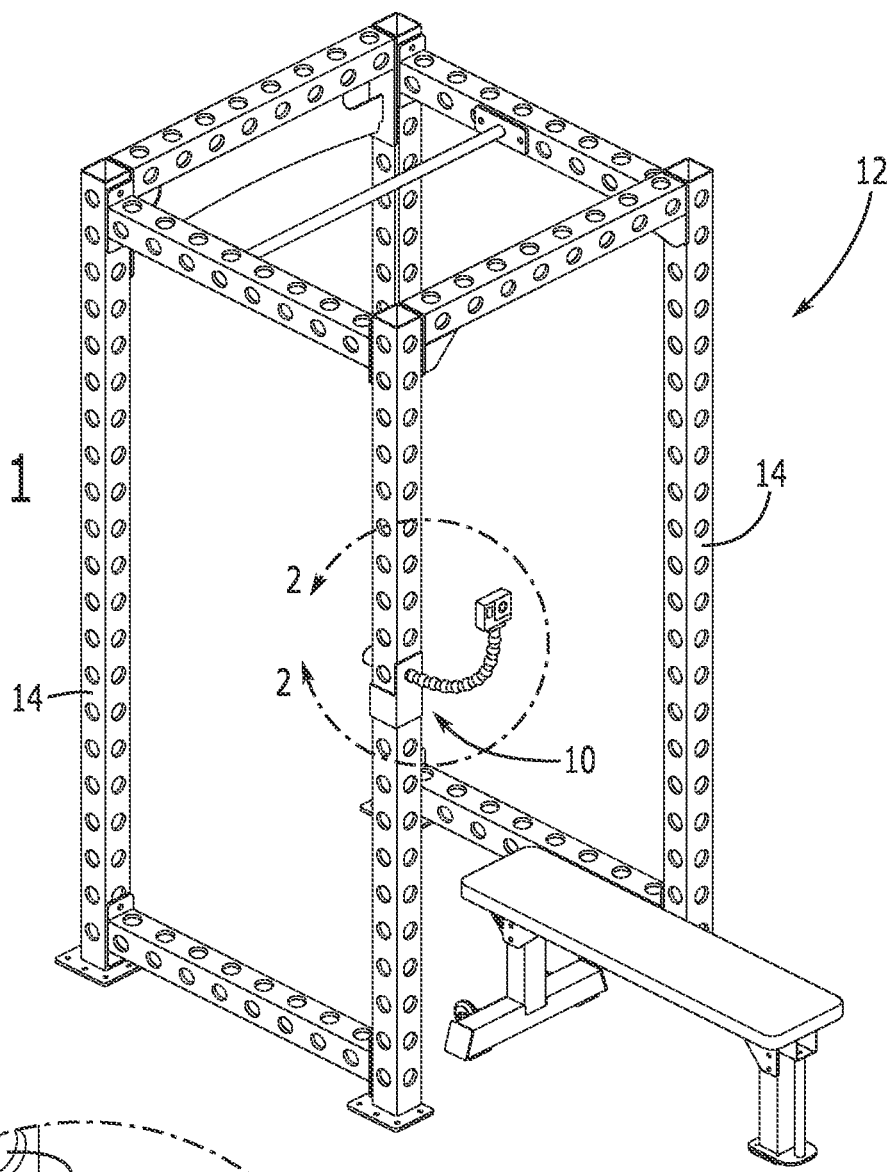
FIG. 1 is a perspective view of an exemplary embodiment of the present invention, shown in use.
Figure 2:
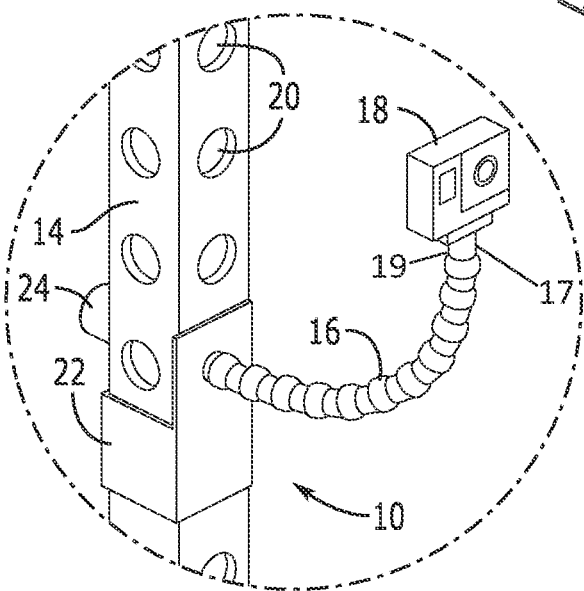
FIG. 2 is a detailed perspective view of FIG. 1, take along line 2-2.
Figure 3:
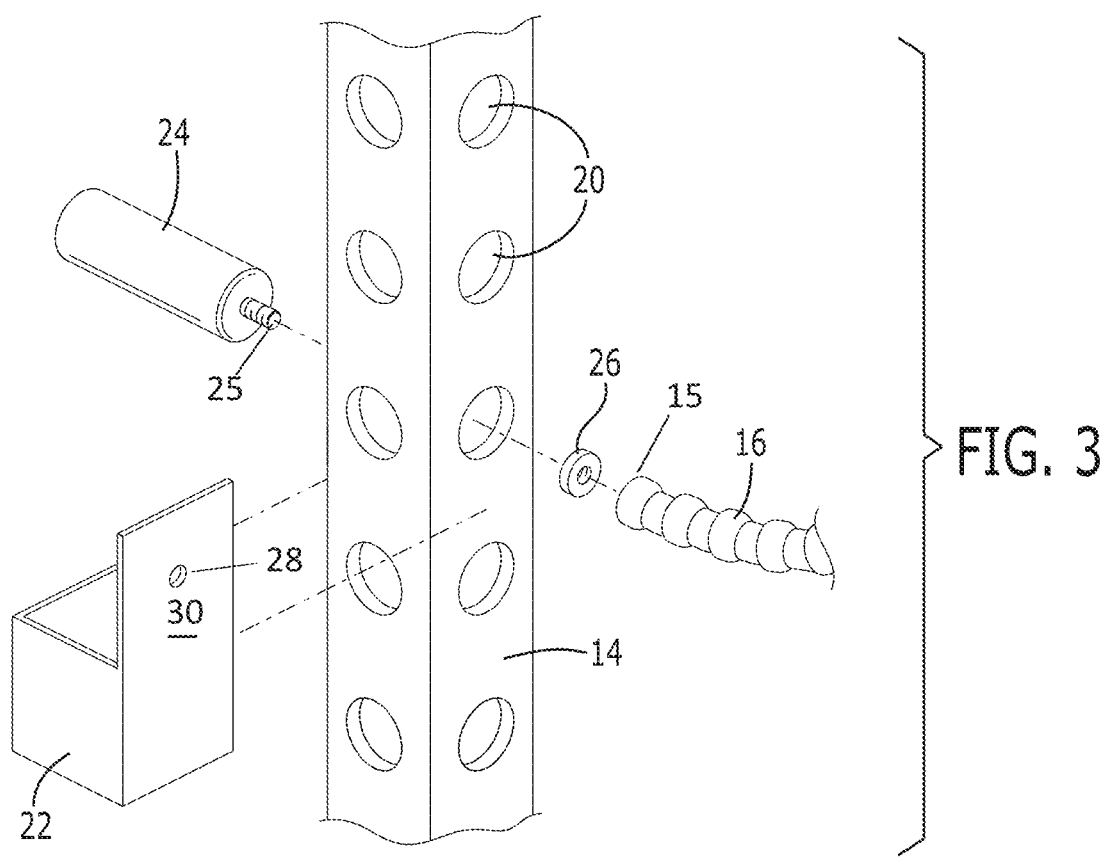
FIG. 3 is a detailed perspective view of an exemplary embodiment of the present invention.
Figure 4:
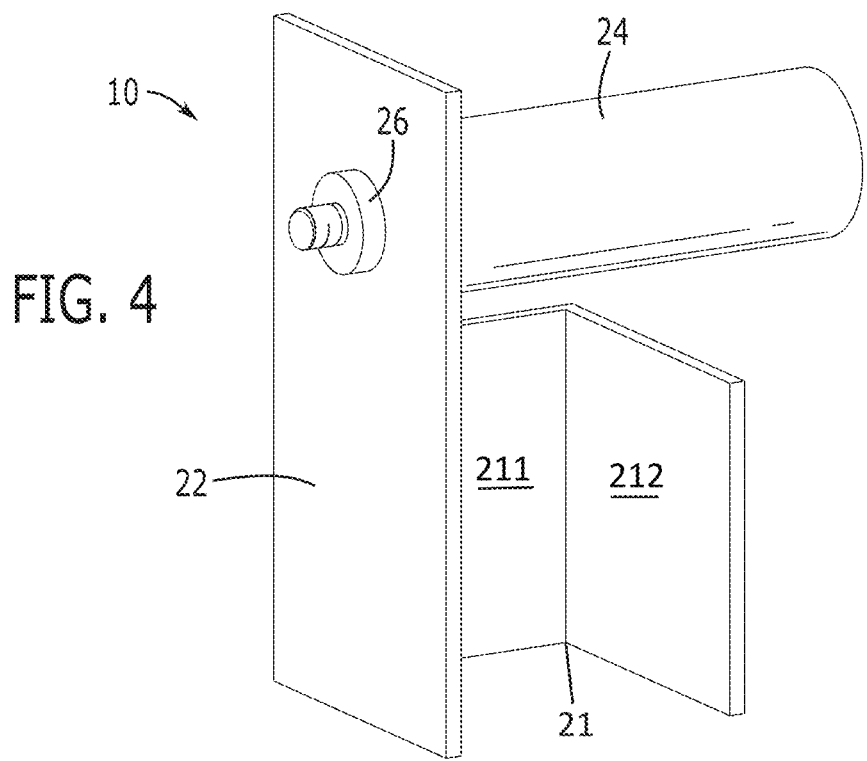
FIG. 4 is a perspective view of an exemplary embodiment of the present invention, illustrating an installation assembly thereof.

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, an embodiment of the present invention provides a lifting rack j-hook phone/camera mount assembly. The lifting rack j-hook phone/camera mount assembly includes a flexible arm that extends from an electronic device to the lifting rack frame member to selective attach to one of the plurality of holes along the frame member. A mounting peg and modified j-hook body is dimensioned and shaped to facilitate that selective attachment.

Referring to FIGS. 1 through 5, the present invention may include a j-hook phone/camera mount assembly 10 dimensioned and shaped to operatively associate with a lifting rack 12. The lifting rack 12 may have rectangular frame members 14. By rectangular frame members 14 it is understood to include frame members having at least two planar elements, wherein two adjacent planar elements are connected edge to edge generally at a 90-degree angle relative to each other. Thus, in some embodiments, a rectangular frame member 14 may include angle brackets. Each planar element is typically made of metal but it can also be made of wood or plastic. The rectangular frame member 14 features holes 20 for being selectively engaged by a j-hook connector for supporting weights or other exercise equipment.

The j-hook phone/camera mount assembly 10 may include a flexible arm 16 a proximal end 15 and a distal end 17. The distal end 17 may operatively associate with a mobile device 18, such as cell phone, audio/video recording device, or any electronic device used to represent or capture an image. The distal end may provide a device mount 19 for effectuation such an operative association.

Figure 5:
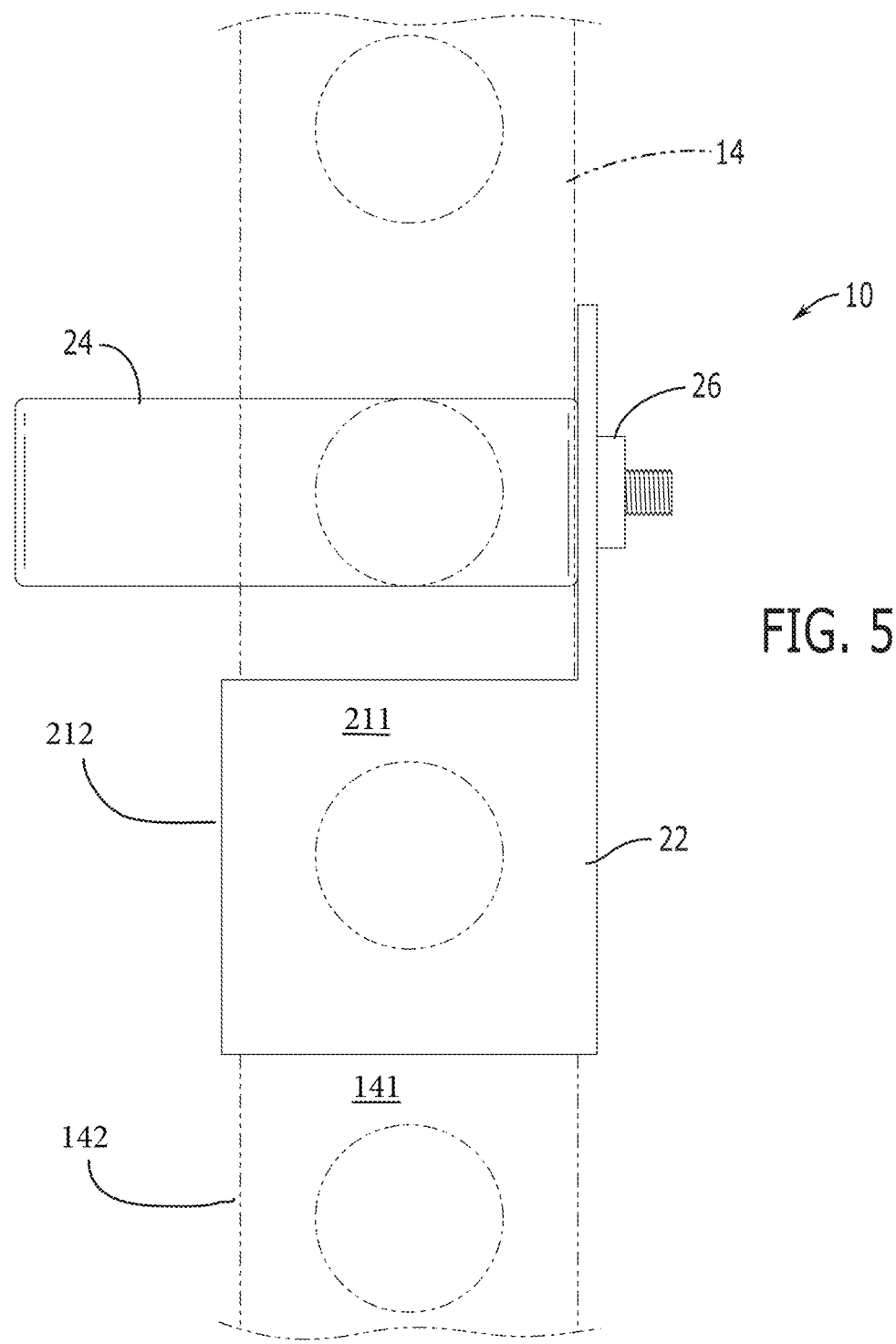
FIG. 5 is a side elevation view of an exemplary embodiment of the present invention, illustrating various placement positions in phantom.

The flexible arm 16 may include multiple articulating joints which enable the flexible arm 16 to be positioned and set at a wide variety of positions, as illustrated in FIG. 5. The multiplicity of articulating joints allows versatile positioning. In this way, the device mount 19 can be maintained at the desired orientation to provide stabilization to its mounted mobile device 18.

The proximal end 15 of the flexible arm 16 may have a female receptor, not shown, that operatively associates through a hole 20 of a frame member 14 of the lifting rack 12 by way of a mounting peg 24. The mounting peg 24 may have a male connector 25 that is received through said hole 20 and into the female receptor to rigidly connect the flexible arm 16 to the frame member 14. A threaded ring 26 may facilitate such a connection.

A modified j-hook body 22 may be dimensioned and shaped to slidable engage the frame member 14, much like a channel, so that a brace plate 30 of the modified j-hook body 22 is disposed between a planar element of the frame member 14 and the flexible arm 16/threaded ring 26 interface. The brace plate 30 may be joined to an angled bracket portion 21 of the modified j-hook body 22 for engaging at least two other faces (if present) of the rectangular frame member 14. The bracket portion may include a first leg and a second leg, orthogonal to the first leg. The at least two faces of the rectangular frame member 14, a first face 141 and a second face 142, are indicated in FIG. 5.

Thereby the modified j-hook body 22 may be inserted and locks into the weightlifting rig/rack 14, whereby the flexible or adjustable mounting arm 16 is integrated into the J-hook at its proximal end 15, while the distal end 17 contains a standard and removable camera or phone mount.

The modified j-hook body 22 could be made either by plastic injection molding or by metal fabrication to receive the flexible/adjustable arm.

As used in this application, the term "about" or "approximately" refers to a range of values within plus or minus 10% of the specified number. And the term "substantially" refers to up to 80% or more of an entirety. Recitation of ranges of values herein are not intended to be limiting, referring instead individually to any and all values falling within the range, unless otherwise indicated, and each separate value within such a range is incorporated into the specification as if it were individually recited herein.

For purposes of this disclosure, the term "aligned" means parallel, substantially parallel, or forming an angle of less than 35.0 degrees. For purposes of this disclosure, the term "transverse" means perpendicular, substantially perpendicular, or forming an angle between 55.0 and 125.0 degrees. Also, for purposes of this disclosure, the term "length" means the longest dimension of an object. Also, for purposes of this disclosure, the term "width" means the dimension of an object from side to side. For the purposes of this disclosure, the term "above" generally means superjacent, substantially superjacent, or higher than another object although not directly overlying the object. Further, for purposes of this disclosure, the term "mechanical communication" generally refers to components being in direct physical contact with each other or being in indirect physical contact with each other where movement of one component affect the position of the other.

The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the disclosed embodiments.

In the following description, it is understood that terms such as "first," "second," "top," "bottom," "up," "down," and the like, are words of convenience and are not to be construed as limiting terms unless specifically stated to the contrary.

It should be understood, of course, that the foregoing relates to exemplary embodiments of the invention and that modifications may be made without departing from the spirit and scope of the invention as set forth in the following claims.

What is claimed is:

1. A lifting rack j-hook mount assembly comprising:
a flexible arm extending from a proximal end to a distal end;
the distal end configured to operatively associate with an electronic device mount;
the proximal end of the flexible arm configured to operatively associate with a frame member of a lifting rack, wherein the proximal end of the flexible arm selectively associates with one of a plurality of holes of said frame member; and
a modified j-hook body configured to receive at least two faces of said frame member so as to place a brace plate between the proximal end of the flexible arm and said frame member.

2. The lifting rack j-hook mount assembly of claim 1, wherein the modified j-hook body comprises a mounting peg that provides a connector that passes through the one of the plurality of holes and the brace plate.

3. The lifting rack j-hook mount assembly of claim 2, wherein the modified j-hook body further comprises an angle bracket portion having two legs orthogonally joined, and wherein at least one leg is parallel with a first face of the at least two faces of the frame member that is orthogonal relative to the brace plate.

4. The lifting rack j-hook mount assembly of claim 3, wherein an upper elevation of the angle bracket portion is downward of an upper elevation of the brace plate.

5. The lifting rack j-hook mount assembly of claim 4, further comprising a threaded ring disposed between the brace plate and the proximal end of the flexible arm.

6. The lifting rack j-hook mount assembly of claim 5, wherein an electronic device removably mounts to the electronic device mount.

7. The lifting rack j-hook mount assembly of claim 6, wherein the flexible arm comprises multiple articulating joints.

8. A method of selectively and removably attaching an electronic device to the lifting rack of the lifting rack j-hook mount assembly of claim 3, the method comprises:
engaging the at least one leg of the angle bracket portion in a parallel orientation of the first face of the at least two faces of the frame member of the lifting rack so that the brace plate is adjacent and parallel with a second face of said at least two faces of the frame member to which the proximal end of the flexible arm is desired to be operatively associated to.

* * * * *